United States Patent
Obuchi et al.

(10) Patent No.: US 7,936,735 B2
(45) Date of Patent: *May 3, 2011

(54) RADIO COMMUNICATION APPARATUS AND TRANSMISSION METHOD

(75) Inventors: Kazuhisa Obuchi, Kawasaki (JP); Shinya Okamoto, Fukuoka (JP); Yoshinori Soejima, Fukuoka (JP); Akihide Otonari, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 389 days.

This patent is subject to a terminal disclaimer.

(21) Appl. No.: 12/010,604

(22) Filed: Jan. 28, 2008

(65) Prior Publication Data

US 2008/0219291 A1 Sep. 11, 2008

(30) Foreign Application Priority Data

Feb. 2, 2007 (JP) ................................. 2007-024739

(51) Int. Cl.
H04W 4/00 (2009.01)
(52) U.S. Cl. .......................... 370/338; 370/474; 714/748
(58) Field of Classification Search .................. 370/389, 370/465, 474, 328, 338, 394, 469; 714/2, 714/18, 748, 749
See application file for complete search history.

(56) References Cited

U.S. PATENT DOCUMENTS

| | | | | |
|---|---|---|---|---|
| 6,760,303 B1* | 7/2004 | Brouwer | ....................... | 370/229 |
| 7,154,873 B2* | 12/2006 | Yi | ................................. | 370/338 |
| 7,359,403 B1* | 4/2008 | Rinne | ........................... | 370/469 |
| 2002/0065093 A1 | 5/2002 | Yi et al. | | |
| 2006/0002416 A1 | 1/2006 | Yagihashi | | |
| 2006/0018318 A1 | 1/2006 | Rinne et al. | | |
| 2008/0037547 A1* | 2/2008 | Jang | ............................. | 370/394 |
| 2009/0175377 A1* | 7/2009 | Iwai et al. | ..................... | 375/295 |
| 2009/0323592 A1* | 12/2009 | Terry | ........................... | 370/328 |

FOREIGN PATENT DOCUMENTS

| | | |
|---|---|---|
| JP | 2006-20044 | 1/2006 |
| KR | 2002-42332 | 6/2002 |
| KR | 2005-34477 | 4/2005 |

OTHER PUBLICATIONS

Korean Intellectual Property Office Action, for corresponding Korean Patent Application No. 10-2008-0010783, dispatched Jan. 28, 2010. Partial English translation attatched.
3rd Generation Partnership Project; Technical Specification Group Radio Access Network; Radio Link Control (RLC) protocol specification (Release 7); 3GPP TS 25.322 V7.2.0; (Sep. 2006).
The State Intellectual Property Office of China "First Notification of Office Action" for corresponding Chinese Patent Application No. 200810009433.8, issued Sep. 26, 2010. English translation attached.

* cited by examiner

*Primary Examiner* — Ricky Ngo
*Assistant Examiner* — Kan Yuen
(74) *Attorney, Agent, or Firm* — Myers Wolin, LLC

(57) ABSTRACT

The transmission side adds retransmission identification information to the RLC sub-PDUs obtained by dividing an RLC PDU, and transmits the RLC sub-PDU with the retransmission identification information added thereto. The reception side refers to the retransmission identification information added to the received RLC sub-PDUs, and stores only the RLC sub-PDUs having retransmission information the same as an assumed value which is preset, into a buffer, and assembles an RLC PDU using the RLC sub-PDUs having the same retransmission identification information.

8 Claims, 10 Drawing Sheets

FIG. 11

Header Extension Type(HE)

| Value | Description |
|---|---|
| 00 | The succeeding octet contains data |
| 01 | The succeeding octet contains a length indicator and E bit |
| 10-11 | Reserved (PDUs with this coding will be discarded by this version of the protocol). |

RADIO COMMUNICATION APPARATUS AND TRANSMISSION METHOD

CROSS-REFERENCE TO RELATED APPLICATIONS

This application is based upon and claims the benefit of priority from the prior Japanese Patent Application No. 2007-24739, filed on Feb. 2, 2007, the entire contents of which are incorporated herein by reference.

BACKGROUND OF THE INVENTION

1. Field of the Invention

The present invention relates to a radio communication apparatus and a transmission method, and more particularly to a radio communication apparatus and transmission method that are suitable for transmitting/receiving variable length RLC sub-PDU data in an RLC layer which belongs to a layer 2 constituting a protocol layer of radio communication, and are suitable for assembling RLC PDU correctly from the retransmitted RLC Sub-PDU data.

2. Description of the Related Art

A W-CDMA system is now widely used as a third generation (3G) radio communication system, and the standard called HSDPA (High-Speed Downlink Packet Access), where the speed of W-CDMA data communication is further increased (maximum 14 Mbps), is now being commercialized. HSDPA, which is an improved version of the 3G system, is also called 3.5G. HSDPA is being standardized by 3GPP (Third Generation Partnership Project), which is a 3G standardization group (see "3GPP TS 25.322").

The features of HSDPA are (1) sharing one physical channel by a plurality of mobile terminals (UE) based on time division, (2) automatically selecting a faster modulation method and encoding method depending on the radio wave status, and (3) using a hybrid ARQ which is a combination of retransmission control (ARQ) and correction encoding processing.

FIG. 1 is a diagram depicting the layer 2 (Layer 2) of a protocol architecture corresponding to HSDPA. The layer 2 is divided into sub-layers, that is MAC (Medium Access Control)-hs, Mac-d and RLC (Radio Link Control).

FIG. 2 is a diagram depicting a format of a RLC PDU (Protocol Data Unit). The RLC PDU in FIG. 2 is an RLC PDU (this may also be called RLC AMD PDU in some cases, and the RLC PDU used herein below is RLC AMD PDU, AMD: Acknowledge Mode Data) that can control data transmission confirmation and data retransmission, and is comprised of a D/C bit for distinguishing user data and control data, a sequence number (SN) for indicating a sequence of RLC PDUs, a polling bit P for indicating the presence of a transmission confirmation request, an HE (Header Extension) type area for indicating the extended information of the user data, a Length Indicator LI, an E bit, a data storage area Data, and a padding bit PAD or a piggybacked STATUS PDU.

The data size of RLC PDU is fixed to 42 oct, 82 oct or 122 oct (1 oct (octet) is 8 bits), for example, and is not changed during communication. RLC PDU is identified by the sequence number SN, and a number in the 0 to 4095 range, for example, is assigned to the sequence number SN.

In the RLC in FIG. 1, the transmission data RLC SDU (Service Data Unit) from the higher layer at the RLC transmission side is divided into a plurality of RLC PDUs, to which a sequence number SN, to identify each PLC PDU, is assigned, and each PLC PDU is transmitted to the MAC-d layer at a lower level.

The RLC reception side, which received the RLC PDUs from the MAC-d layer at a lower level, rearranges the RLC PDUs in the sequence of the sequence numbers SN, connects them to assemble an RLC SDU, and transmits the RLC SDU to the higher layer. If a sequence number SN is missing, a retransmission of the RLC PDU corresponding to this missing SN is requested.

In preparation for the case when a retransmission is requested, the RLC transmission side must keep the transmitted RLC PDU in a buffer (memory) until a transmission confirmation notice is received from the RLC reception side. The RLC reception side has a buffer (memory) for storing a number of RLC PDUs required for assembling an RLC SDU, and assembles the RLC SDU when all the RLC PDUs required for assembling a RLC SDU are stored.

The transmission confirmation control is performed by the RLC transmission side setting the polling bit included in the RLC PDU P to "1". If the reception side receives an RLC PDU of which polling bit P is set to "1", the reception side confirms no sequence number SN of the RLC PDUs received thus far is missing, and transmits STATUS PDU (ACK) if no sequence number is missing. If missing, the reception side responds with STATUS PDU (NACK). The reception side has a timer to prevent the frequent generation of STATUS PDU responses after one STATUS PDU response, and if NACK is used to advise that information is missing, the timer is started at that point, and the next STATUS PDU response is not performed until the timer is up.

The transmission side starts the timer after a transmission confirmation request is transmitted, and if a STATUS PDU response is not received from the reception side before the timer is up, it is judged that a data loss occurred in a radio band, and transmits the RLC PDU in which the polling bit P is set to "1" again. If a STATUS PDU (ACK) is received, it is judged that RLC PDUs have been transmitted/received normally thus far, and if a retransmission request by STATUS PDU (NACK) is received, then the RLC PDU of which retransmission request is requested is transmitted again.

Japanese Patent Application Laid-Open No. 2006-20044 discloses a memory management method that divides a MAC-hs PDU, which is a variable length data, into RLC PDC units in an MAC-hs sub-layer, and stores each RLC PDU along with a sequence number in a shared memory (buffer) so that a complicated memory control need not be used, and an increase in memory volume can be suppressed.

SUMMARY OF THE INVENTION

Once the above mentioned 3.5G mobile communication system based on HSDPA is implemented, it is expected to soon transmit a shift to a fourth generation (4G), which implements an even faster speed and larger capacity, but another stage called 3.9G (also called super 3G) is scheduled before a complete shift to the fourth generation. The communication speed, which is expected in 3.9G, is about a 100 Mbps maximum speed. Changing an RLC PDU having a fixed length, shown in FIG. 1 to FIG. 2, to a variable length for the specifications of 3.9G is now under consideration by the 3GPP. Also if an RLC PDU is retransmitted because of a missing RLC PDU, dividing the RLC PDU into a plurality of variable length RLC sub-PDUs and retransmitting them in accordance with the line quality and such is being considered.

In other words, making both an RLC PDU and RLC sub-PDU to be variable length is possible.

FIG. 3 is a diagram depicting a configuration example of an RLC sub-layer when an RLC sub-PDU has a variable length. As FIG. 3 shows, if the RLC sub-PDU has a variable length, it is possible to use the sequence number SN as a number for identifying the RLC PDU, and to use a segment indicator SI for identifying an RLC sub-PDU constituting each RLC PDU. In the case when an RLC PDU and RLC sub-PDU have fixed lengths, a number of RLC sub-PDUs constituting a fixed length RLC PDU is uniquely determined, so an RLC PDU can be identified by identifying the RLC sub-PDU. In the case when an RLC sub-PDU has a variable length, however, a number of RLC sub-PDUs constituting an RLC PDU is not uniquely determined. Therefore the sequence number SN for identifying an RLC sub-PDU is used as a symbol for identifying an RLC PDU, and the segment indicator SI is newly used as a symbol for identifying an RLC sub-PDU. LSI (Last Segment Indicator) indicates the final segment in division.

FIG. 4 is a diagram depicting an example of a format when an RLC sub-PDU has a variable length. If the RLC sub-PDU has a variable length, the sequence number SN is a number for identifying an RLC PDU, and an RLC sub-PDU is identified by this sequence number SN and a segment indicator SI there under.

The following problems, however, occur in the case of retransmission control when the RLC sub-PDU has a variable length. Let us assume the case when the transmission side changed the transmission unit from RLC sub-PDU to RLC PDU, so that the RLC sub-PDU data division size can be changed for each retransmission, which may occur due to such a reason as the influence of line quality. In this case, when the reception side recognizes at least one missing RLC sub-PDU out of a plurality of RLC sub-PDUs resulting by dividing an RLC PDU, the reception side responds with STATUS PDU (NACK) (retransmission request) to request retransmission to the transmission side, clears the information on the received RLC sub-PDUs of the RLC PDU which was recognized as incomplete data, and waits for the RLC sub-PDUs of the RLC PDU to be retransmitted.

However, if the retransmission target RLC PDU is divided into a plurality of RLC sub-PDUs and the missing RLC sub-PDU(s) is/are recognized before receiving all the RLC sub-PDUs corresponding to this RLC PDU, it is possible that the RLC sub-PDU(s) recognized as missing may be delayed and received, due to a reception delay, after responding with STATUS-PDU (NACK). In such a case, the RLC sub-PDUs of the RLC PDU, for which retransmission was newly requested there after, are also received.

In this case, the reception side cannot recognize whether the received RLC sub-PDU is the first retransmission data or the second retransmission data, since this retransmission data cannot be distinguished, so the divided RLC sub-PDUs may be mixed up and combined.

FIG. 5 is a diagram depicting an example when the RLC sub-PDU of the first retransmission and the RLC sub-PDU of the second retransmission coexist. The RLC sub-PDUs having a variable length are transmitted in the format in FIG. 4, and the received RLC sub-PDUs are sequentially stored in a buffer memory at the reception side.

In (1) of FIG. 5, the RLC sub-PDU of SN=0 and SI=1 is missing, and in (2), the STATUS PDU generation timing is from the P bit attached to the RLC sub-PDU at SN=0 and SI=3, and NACK (retransmission request), with incomplete data information SN=0 (RLC sub-data of SN=0 is missing), is transmitted to the transmission side. At this time, the already received information of SN=0 and SI=0, 2, and 3 is cleared once (deleted from the buffer), so as to prepare for receiving the retransmission data. Then the reception side receives the RLC sub-PDU of SN=0, SI=4 and 5, and stores this data in the buffer. Since LSI=1 is set for the RLC sub-PDU of SN=0 and SI=5, the reception side recognizes that the RLC PDU of SN=0 is divided into six RLC sub-PDUs.

The transmission side receives STATUS PDU (NACK) in (3), and retransmits the RLC PDU of SN=0. At this time, the transmission side changes the number of divisions of the RLC PDU from six to seven, and retransmits the data. The number of divisions is changed in real-time depending on the line status and quality.

When the reception side receives SN=0, and SI=0, 1, 2 and 3, this means that all the sub-PDUs divided into six are received, so the reception side generates an RLC PDU by connecting the RLC sub-PDUs.

However, the reception side actually generates the RLC PDU by connecting SI=4 and 5 of the SUB-PDUs divided into six in the first retransmission and SI=0, 1, 2 and 3 of the RLC sub-PDUs divided into seven in the second retransmission, so the RLC PDU of SN=0 cannot be generated correctly. For example, an error is detected by an error detection bit included in the RLC PDU. Also the RLC sub-PDUs retransmitted in (5), (6) and (7) are recognized as already received data which is received again, and these RLC sub-PDUs are discharged, and the PLC PDU cannot be assembled by the retransmitted RLC sub-PDUs.

Moreover, in (8), before transmitting all the RLC sub-PDUs of SN=0, STATUS PDU (ACK), which is regarded as all the RLC sub-PDUs of the RLC PDU of SN=0 have been received, is received from the reception side, and a contradiction is generated.

With the foregoing in view, it is an object of the present invention to provide a radio communication apparatus and transmission method that can handle the case when the division mode of data (RLC PDU) is different for each transmission (retransmission).

It is another object of the present invention to provide a radio communication apparatus that correctly can assemble original data before division from the received divided data.

An example of the data is RLC-PDU, and data obtained by dividing RLC-PDU is RLC sub-PDU.

To achieve the above objects, a first aspect of a radio communication apparatus of the present invention is a radio communication apparatus which receives variable length RLC sub-PDU data by an RLC layer belonging to a layer 2 constituting a protocol layer of radio communication, and assembles one RLC PDU data from a plurality of RLC sub-PDU data, having: a buffer memory; and a controller which refers to retransmission identification information included in a header of received RLC sub-PDU data, stores into the buffer memory RLC sub-PDU data having the retransmission identification information identical to a preset assumed value into the buffer memory, and assembling the RLC PDU data from the RLC sub-PDU data having the identical retransmission identification information.

A second aspect of the radio communication apparatus of the present invention is the above-mentioned first aspect wherein the controller changes the assumed value whenever transmitting a retransmission request for RLC sub-PDU data corresponding to predetermined RLC PDU data.

A third aspect of the radio communication apparatus of the present invention is the above mentioned second aspect wherein the retransmission identification information is the number of times of retransmission, and the controller increments the assumed value by a predetermined unit value whenever transmitting a retransmission request for RLC sub-PDU data corresponding to predetermined RLC PDU data.

A fourth aspect of the radio communication apparatus of the present invention is the above mentioned second aspect wherein the retransmission identification is binary information, and the controller alternately switches the assumed value between the binary values whenever a retransmission request for RLC sub-PDU data corresponding to predetermined RLC PDU data.

A fifth aspect of the radio communication apparatus of the present invention is the above mentioned fourth aspect, wherein the binary information is assigned to one bit in a data extension area, HE (Header Extension) area, in a header of the RLC sub-PDU data.

A sixth aspect of the radio communication apparatus of the present invention is a radio communication apparatus for transmitting variable length RLC sub-PDU data in an RLC layer belonging to a layer 2 constituting a protocol layer of radio communication, having: a generator for generating a plurality of variable length RLC sub-PDU data by dividing one RLC PDU data; and a transmission controller for adding first retransmission identification information to the generated plurality of RLC sub-PDU data, and transmitting the RLC sub-PDU data with the first retransmission identification information added thereto, and for adding second retransmission identification information, which is different from the first retransmission identification information, to the RLC sub-PDU data, and retransmitting the RLC sub-PDU data with the second retransmission identification information added thereto when a retransmission request for the transmitted RLC sub-PDU data is received.

A seventh aspect of the radio communication apparatus of the present invention is the above mentioned sixth aspect wherein the second retransmission identification information is a value obtained by adding a predetermined value to the first retransmission identification information.

An eighth aspect of the radio communication apparatus of the present invention is the above mentioned sixth aspect wherein the first retransmission identification information and the second identification information are binary information, which are one and the other of the binary values respectively.

A ninth aspect of the radio communication apparatus of the present invention is the above mentioned eighth aspect, wherein the binary information is assigned to one bit in a data extension area, HE (Header Extension) area, in a header of the RLC sub-PDU data.

A tenth aspect of the radio communication apparatus of the present invention is a radio communication apparatus for transmitting variable length RLC sub-PDU data, having: a generator for generating a plurality of variable length RLC sub-PDU data by dividing one RLC PDU data; and a transmission controller for adding first identification information indicating a first retransmission to the plurality of RLC sub-PDU data and transmitting the RLC sub-PDU data with the first retransmission identification information added thereto, and adding second identification information indicating a second retransmission, which is different from the first retransmission, to the RLC sub-PDU data obtained by dividing the RLC-PDU, and retransmitting the RLC sub-PDU data with the second retransmission identification information added thereto when a retransmission request for the transmitted RLC sub-PDU data is received.

An eleventh aspect of a transmission method of the present invention is a transmission method for transmitting variable length RLC sub-PDU data from a radio communication apparatus, having the steps of: generating a plurality of variable length RLC sub-PDU data by dividing one RLC PDU data; and adding first identification information indicating a first retransmission to the plurality of RLC sub-PDU data and transmitting the RLC sub-PDU data with the first identification information added thereto, adding second identification information indicating a second retransmission, which is different from the first retransmission, to the RLC sub-PDU data obtained by dividing the RLC-PDU, and retransmitting the RLC sub-PDU data with the second identification information added thereto when a retransmission request for the transmitted RLC sub-PDU data is received.

According to the present invention, a radio communication apparatus and a transmission method that can support a case when the division mode of the data (RLC PDU) is different for each transmission (retransmission) can be provided.

According to another aspect, a radio communication apparatus that can correctly assemble original data before division from the received divided data can be provided.

Also according to the present invention, it can be identified whether a received RLC sub-PDU was transmitted based on a predetermined retransmission request, by the retransmission identification information included in the header of the RLC sub-PDU, and a correct RLC PDU can be generated by combining the RLC sub-PDUs having a same retransmission identification information.

BRIEF DESCRIPTION OF THE DRAWINGS

FIG. 11 is a table showing the definitions of a data extension area HE of the RLC PDU header.

DESCRIPTION OF THE PREFERRED EMBODIMENTS

Embodiments of the present invention will now be described with reference to the drawings. These embodiments, however, do not limit the technical scope of the present invention.

Figure 1:
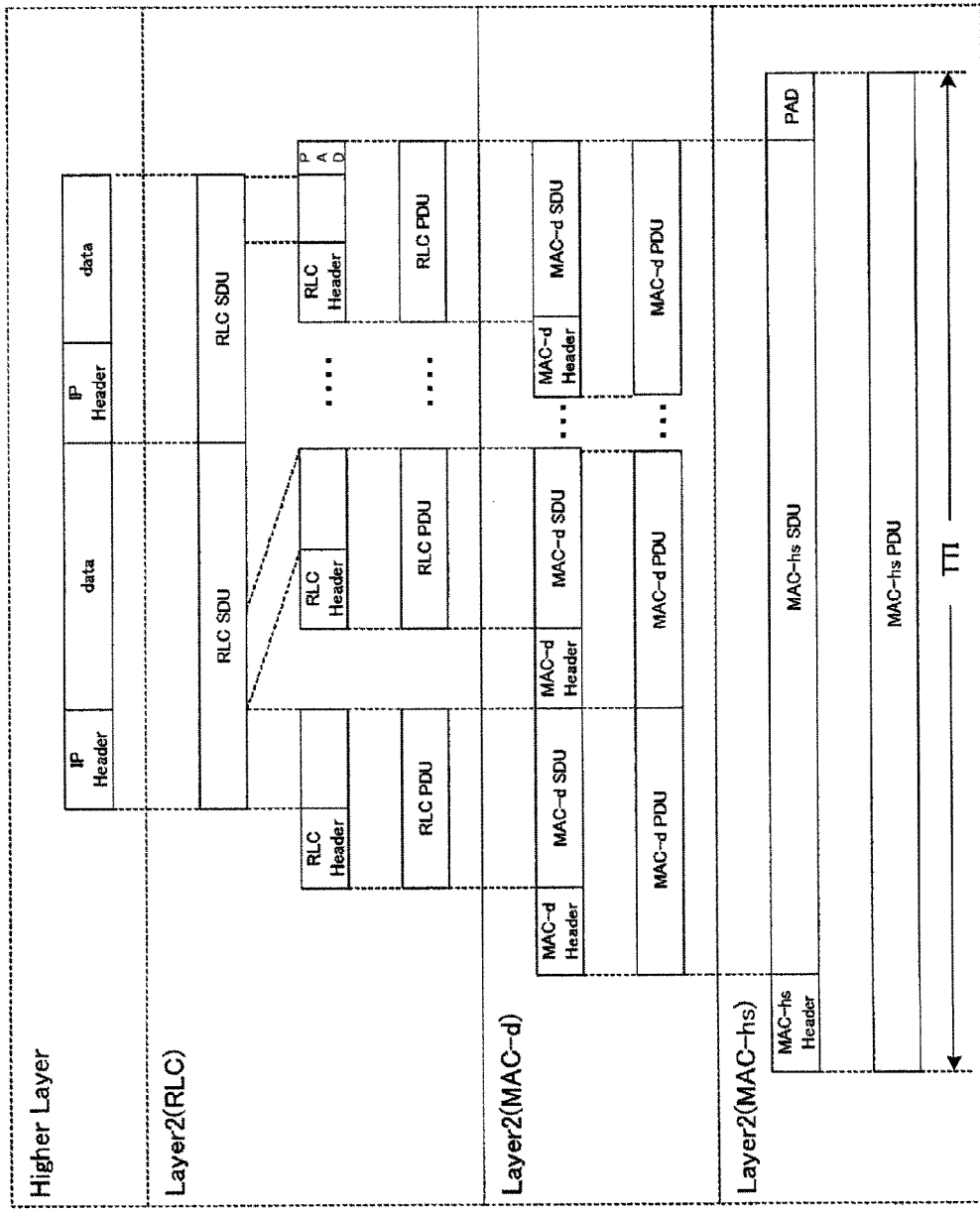
FIG. 1 is a diagram depicting a data configuration of the layer 2 of a protocol architecture corresponding to HSDPA.
Figure 2:
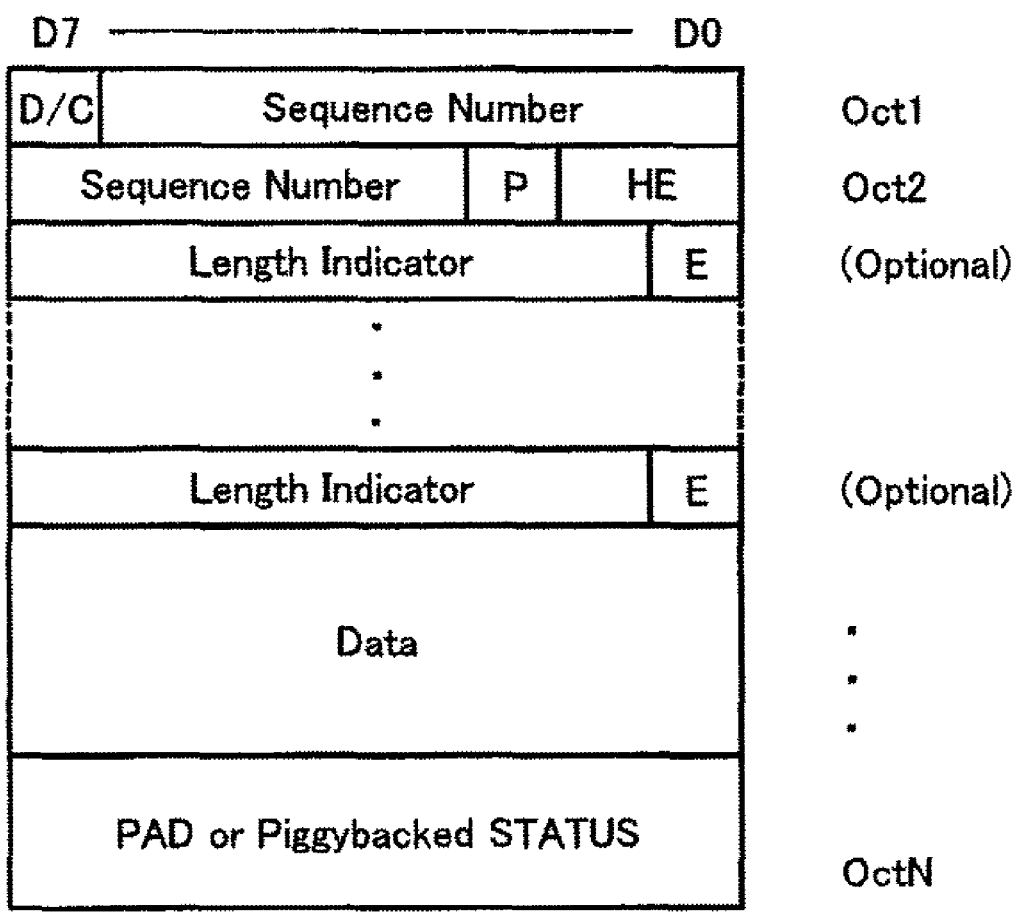
FIG. 2 is a diagram depicting a format of RLC PDU (Protocol Data Unit)
Figure 3:
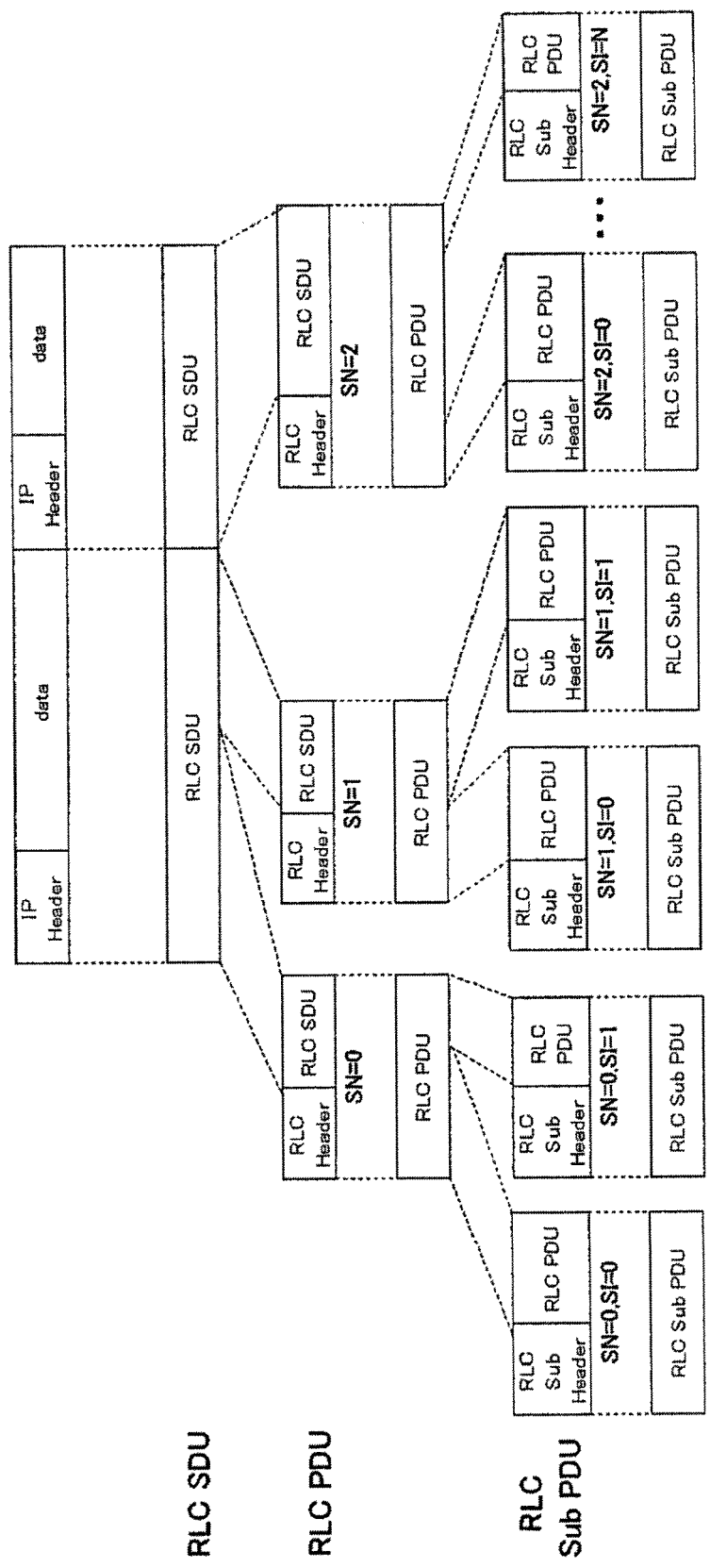
FIG. 3 is a diagram depicting a configuration of an RLC sub-layer which is assumed when the RLC PDU is divided into a plurality of variable length RLC sub-PDUs for retransmission.
Figure 4:
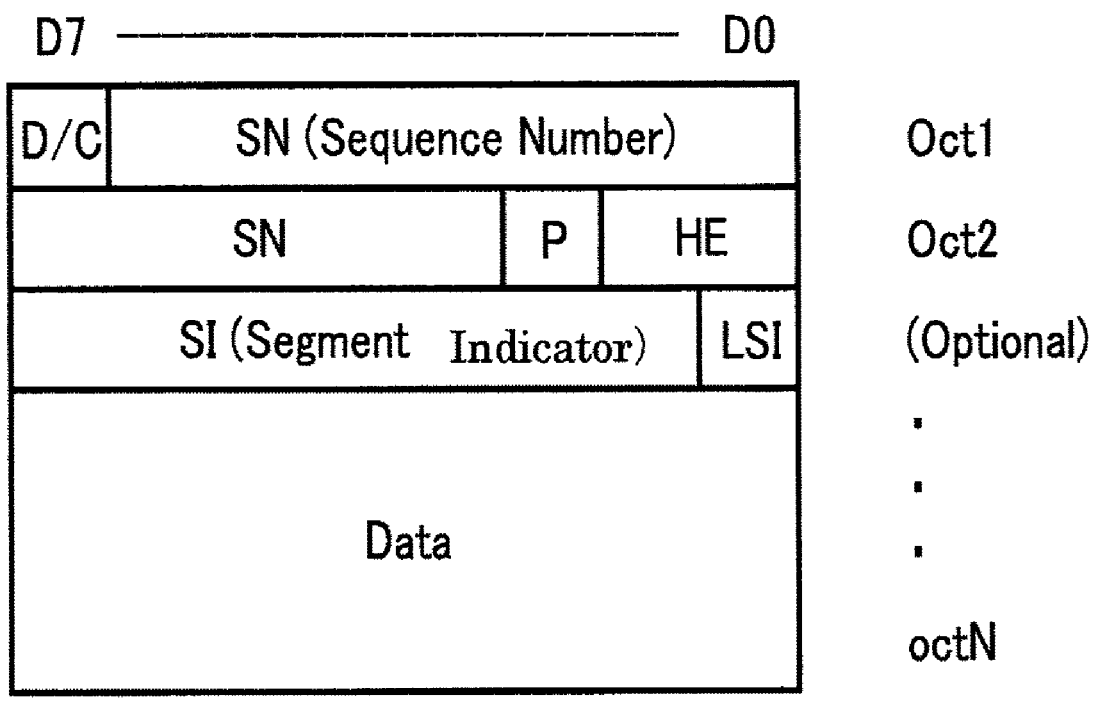
FIG. 4 is a diagram depicting a format example when the RLC sub-PDU has a variable length.
Figure 5:
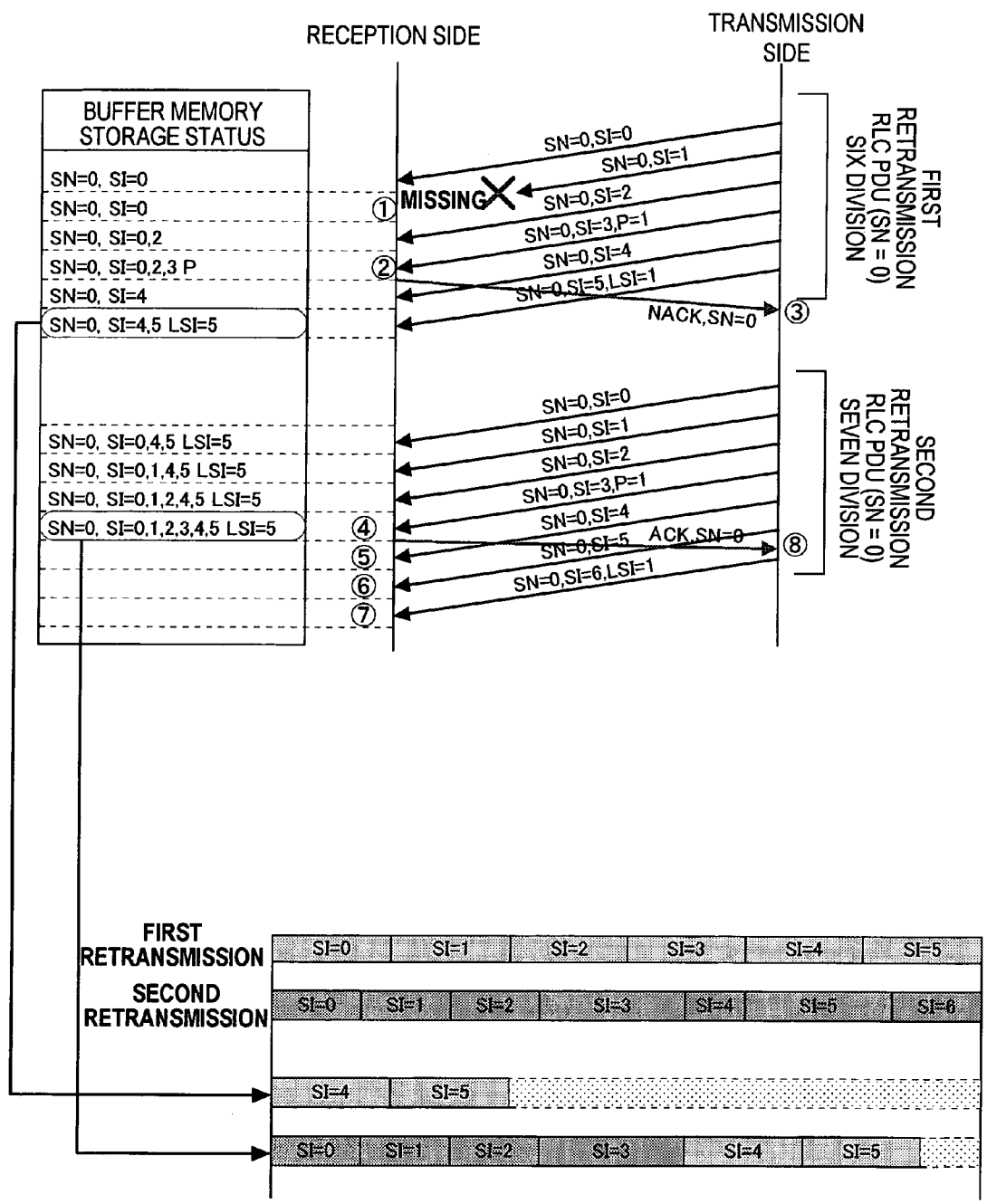
FIG. 5 is a diagram depicting an example when RLC sub-PDUs initially transmitted and retransmitted RLC sub-PDUs coexist.
Figure 6:
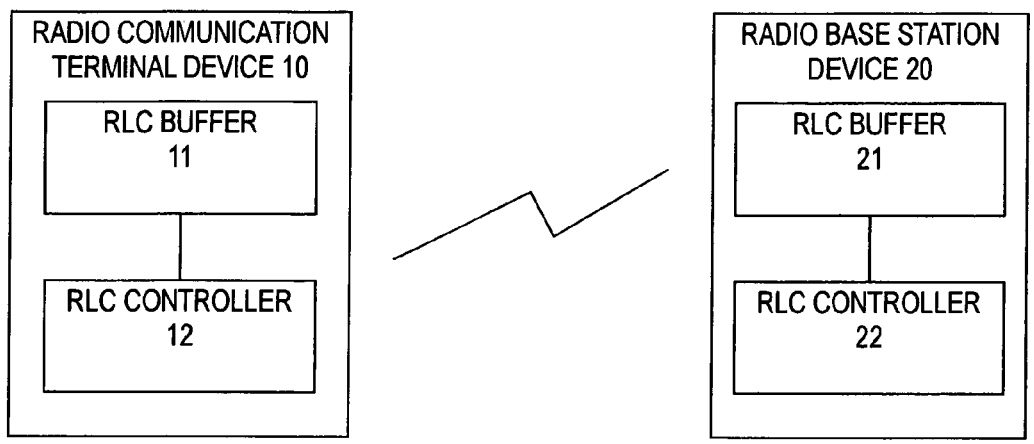
FIG. 6 is a block diagram depicting a radio communication apparatus according to an embodiment of the present invention.

FIG. 6 is a block diagram depicting a radio communication apparatus according to an embodiment of the present invention. The radio communication apparatus is a radio communication terminal device 10 or a radio base station device 20, and each of the radio communication terminal device 10 and the radio base station device 20 comprises an RLC buffer 11, 22 and an RLC controller 12, 22 which performs read control and write control for the RLC buffer respectively. The embodiment to be described below is a control at the RLC transmission side and reception side, and if the present invention is applied to such a downlink as HSDPA, the radio communication terminal device 10 becomes a reception side radio communication apparatus, and the radio base station device 20 becomes a transmission side radio communication apparatus, and if the present invention is applied to such an uplink as HSUPA, the radio communication terminal device 10 becomes a transmission side radio communication apparatus, and the radio base station device 20 becomes a reception side radio communication apparatus. Hereafter, a case of downlink, where the radio communication terminal device 10 is a reception side device and the radio base station device 20 is a transmission side device, will be described below, but the embodiment of the present invention can be applied to the case of an uplink in the same manner. The RLC controller 12 and 22 may be hardware, software or a combination thereof.

If the RLC controller 12, 22 is applied to the transmission side, the RLC controller 12, 22 divides an RLC PDU into a plurality of variable length RLC sub-PDUs, and adds retransmission identification information to a header of the generated RLC sub-PDUs, and transmits the RLC sub-PDUs with the retransmission identification information added thereto based on an RLC sub-PDU retransmission request from the reception side.

If the present invention is applied to the reception side, the RLC controller 12, 22 refers to the retransmission identification information added to the received RLC sub-PDUs, and stores only the RLC sub-PDUs, having a same retransmission identification information as the assumed value which is preset, into the buffer 11, 21, and assembles the RLC PDU from the RLC sub-PDUs having the same retransmission identification information, as described below.

Figure 7:
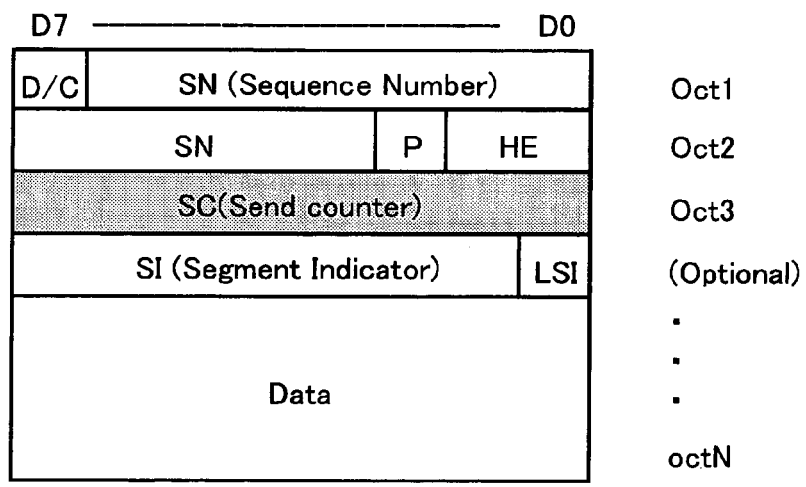
FIG. 7 is a diagram depicting a first format example of the RLC sub-PDU according to an embodiment of the present invention.

FIG. 7 is a diagram depicting a first format example of the RLC sub-PDU according to an embodiment of the present invention. In addition to the sequence number SN and the segment indicator SI, a header of the RLC sub-PDU has a retransmission count (the number of times of retransmission) SC (Send Counter) as retransmission identification information. The reception side RLC controller 12 recognizes an assumed value of a retransmission count SC of the RLC sub-PDU to be received as "0 (default value)"before retransmission is requested, and increments the assumed value of the retransmission count SC included in the received RLC sub-PDU every time a retransmission request is transmitted (every time STATUS PDU (NACK) is transmitted). SC can simply be identifiable between the first retransmission (retransmission of the RLC sub-PDU) and the second retransmission (retransmission of the RLC sub-PDU). For example, SC=0 (example of first identifier) in the first retransmission and SC=1 (example of second identifier) in the second retransmission.

It is even more preferable to provide three or more types of SCs. The first SC is used for the first retransmission, the second SC is used for the second retransmission, the third SC is used for the third retransmission, and the first SC is used for the fourth retransmission. By this, the probability of confusion of retransmission data, which occurs by reusing SCs, can be decreased.

The retransmission count (the number of times of retransmission) SC is added to each RLC sub-PDU at the transmission side (if the RLC controller 12 is the reception side, the transmission side is the RLC controller 22), and when STATUS PDU (NACK) is received from the reception side RLC controller 12, the transmission side increments the retransmission count SC of the retransmission target RLC sub-PDU each time the retransmission target RLC sub-PDU is transmitted, and transmits the RLC sub-PDU.

The reception side RLC controller 12 refers to the retransmission count SC of the received RLC sub-PDU, judges whether all the RLC sub-PDUs having a same retransmission count SC are received or not for a certain sequence number SN, then assembles the RLC PDU by combining the RLC sub-PDUs having a same retransmission count SC. This will be described in detail with reference to FIG. 8. Here RLC sub-PDUs having SC=0 are combined, and the RLC sub-PDUs having SC=1 are combined.

Figure 8:
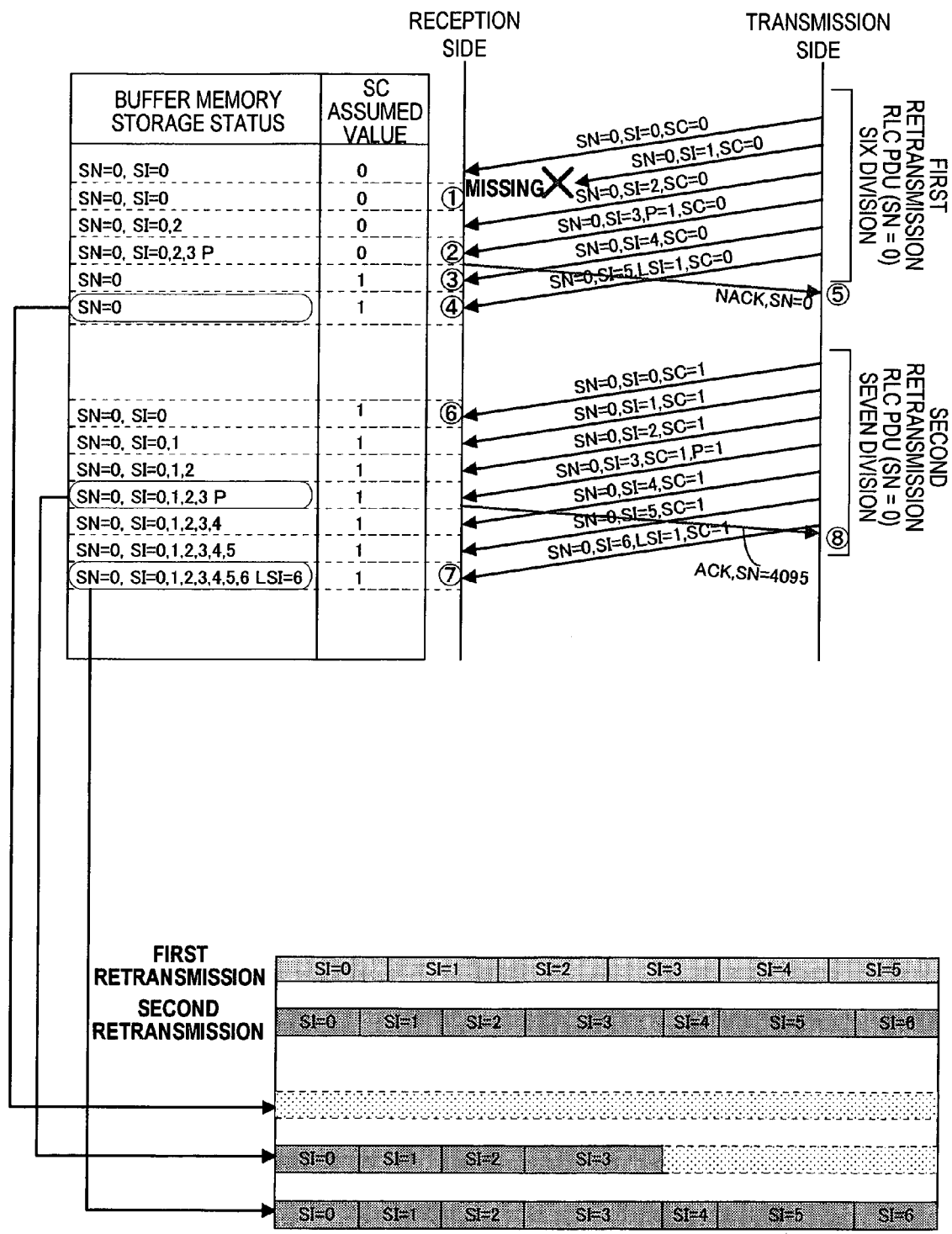
FIG. 8 is a diagram depicting a first operation example of the RLC controller 12 according to an embodiment of the present invention.

FIG. 8 is a diagram depicting a first operation example of the RLC controller 12 according to an embodiment of the present invention. The RLC PDU having sequence number SN=0 is divided into six at the first retransmission, and six RLC sub-PDUs having sequence number SN=0 and segment indicator SI=0 to 5 are transmitted from the transmission side RLC controller 22. At this time, the retransmission count SCs of the transmitted RLC sub-PDUs are all SC=0. The reception side RLC controller 12 also assumes that reception of the RLC sub-PDUs having retransmission count SC=0, since this is the first retransmission of the RLC sub-PDUs having the sequence number SN=0.

The reception side RLC controller 12 sequentially receives the transmitted RLC sub-PDUs, confirms that the retransmission counts thereof are SC=0, and stores the RLC sub-PDUs into the RLC buffer 11. In (1) in FIG. 8, the RLC sub-PDU having SN=0 and SI=1 is missing, and in (2), the STATUS-PDU generation timing is from the P bit assigned to the RLC sub-PDU having SN=0 and SI=3, and the reception side RLC controller 12 transmits a retransmission request to the transmission side as STATUS-PDU (NACK) with missing information SN=0 (RLC sub-PDU having SN=0 is missing).

When the retransmission request is transmitted, the RLC controller 12 clears (deletes from buffer) the information having SN=0 and SI=0, 2 and 3, which has already been received, so as to prepare for receiving the retransmission data, and increments the assumed value of the retransmission count SC by+1, and stands by for reception of the RLC sub-PDUs having retransmission count SC=1. Then the RLC controller 12 receives the RLC sub-PDUs having SN=0 and SI=4, 5 in (3) and (4), but discards these RLC sub-PDUs without storing them into the RLC buffer 11 since the retransmission count thereof is SC=0, which is different from the assumed retransmission count SC=1.

When the retransmission request STATUS-PDU (NACK) is received from the reception side RLC controller 12 in (5) in FIG. 8, the transmission side RLC controller 22 executes the retransmission control, in which the value of the retransmission count SC of the RLC sub-PDU to be retransmitted is incremented by +1, and transmits this RLC sub-PDU having SC=1. As FIG. 8 shows, the RLC PDU having a sequence number SN=0 to be transmitted is divided into seven, and seven RLC sub-PDUs having sequence number SN=0 and segment indicator SI=0 to 6 are transmitted from the transmission side RLC controller 22.

In (6) in FIG. 8, the reception side RLC controller 12 sequentially receives the retransmitted RLC sub-PDUs, confirms that the retransmission count SC thereof is the assumed retransmission count SC=1, and stores the RLC sub-PDUs into the RLC buffer 11. In the retransmission, the RLC controller 12 receives the RLC sub-PDUs in the sequence of the segment indicator SI, and in (7) in FIG. 8, the RLC controller 12 receives the RLC sub-PDUs (SN=0, SI=6) having LSI=1, that is the last segment indicator SI, and when all the RLC sub-PDUs having the sequence number SN=0 are received, the RLC controller 12 combines the RLC sub-PDUs having the sequence number SN=0, and generates the RLC PDU having the sequence number SN=0.

The reception side RLC controller 12 transmits STATUS-PDU from the P bit which is added to the RLC sub-PDU having SN=0 and SI=3 in retransmission, but there is no missing RLC sub-PDU at this point, so the reception side RLC controller 12 transmits STATUS-PDU (ACK) to recognize that all the RLC sub-PDUs up to SN=4095 before SN=0 have been received, and the transmission side RLC controller 22 receives this, hence retransmission control is not performed again.

If data missing occurs again in retransmission, and the retransmission control is performed again, the retransmission count SC is incremented +1, and becomes SC=2, and when all the RLC sub-PDUs having SC=2 are received, the RLC PDU is assembled by these RLC sub-PDUs. In this way, the reception side RLC controller identifies the retransmitted RLC sub-PDUs by the retransmission count SC included in the RLC sub-PDU, and generates the RLC PDU by combining the RLC sub-PDUs having a same retransmission count SC.

If the RLC sub-PDUs have a variable length and the RLC PDU division mode is different for each retransmission of RLC sub-PDUs, the RLC PDU cannot be correctly assembled if the RLC sub-PDUs before and after retransmission are mixed up, but according to the operation of the present embodiment, it can be identified whether the received RLC sub-PDU is retransmitted data, and the retransmission count of the retransmission data can be identified by the retransmission count SC included in the transmitted RLC sub-PDU, and an RLC PDU can be correctly generated by combining the RLC sub-PDUs having a same retransmission count SC.

Figure 9:
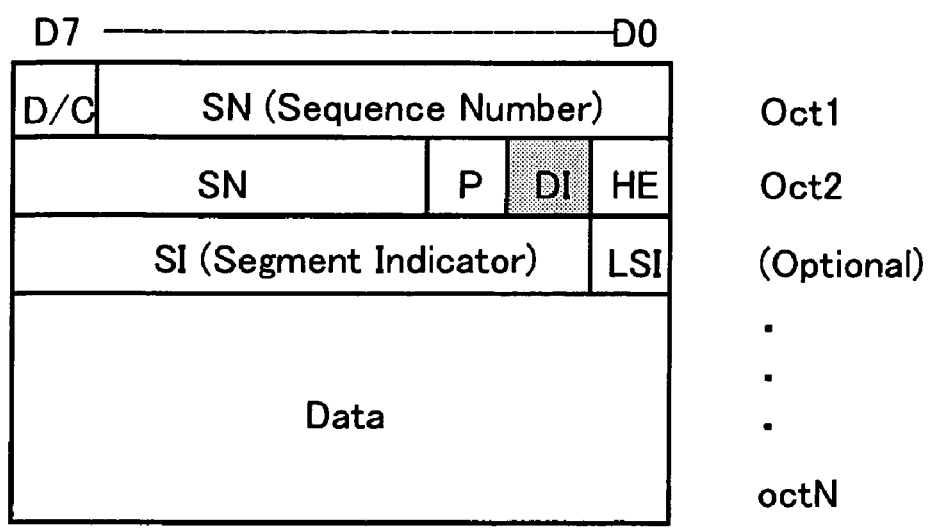
FIG. 9 is a diagram depicting a second format example of an RLC sub-PDU according to an embodiment of the present invention.

FIG. 9 is a diagram depicting a second format example of the RLC sub-PDU according to an embodiment of the present invention. In addition to a sequence number SN and a segment indicator SI, a header of the RLC sub-PDU has a DI (Data Index) bit (binary information) of which the 1/0 is switched each time data is retransmitted as retransmission identification information. The reception side RLC controller 12 recognizes the assumed value of a retransmission count SC of the RLC sub-PDU to be received as "0 (default value)", and switches the assumed value of the DI bit included in the received RLC sub-PDU between 1 and 0 every time the retransmission request is transmitted (every time STATUS-PDU (NACK) is transmitted). In other words, when RLC sub-PDUs having a same sequence number SN are retransmitted, the DI bit becomes "1" at the first retransmission, then the DI bit becomes "0" at the second retransmission, and the DI bit becomes "1" at the third retransmission.

For the DI bit, the higher bit of the 2 bit area, which is assigned in advance as the HE (Header Extension) type data extension area for indicating user data extension information, is used, for example. FIG. 11 shows the values of the data extension area HE defined by 3GPP, and since the higher bit is not now used as "Reserved", this bit is assigned as the bit for identifying the retransmission, thereby the DI bit can be added without increasing the data length of the header.

The DI bit is added by the transmission side (if the RLC controller 12 is the reception side, the transmission side is the RLC controller 22), and when STATUS-PDU (NACK) is received from the reception side RLC controller 12, the transmission side switches the value of the DI bit each time the retransmission target RLC sub-PDU is transmitted, and transmits the RLC sub-PDUs.

The reception side RLC controller 12 refers to the DI bit of the received RLC sub-PDU, judges whether all the RLC sub-PDUS have a same DI bit value for a certain sequence number SN, then assembles the RLC PDU by combining the RLC sub-PDUs having the same DI bit. This will be described in detail with reference to FIG. 10.

Figure 10:
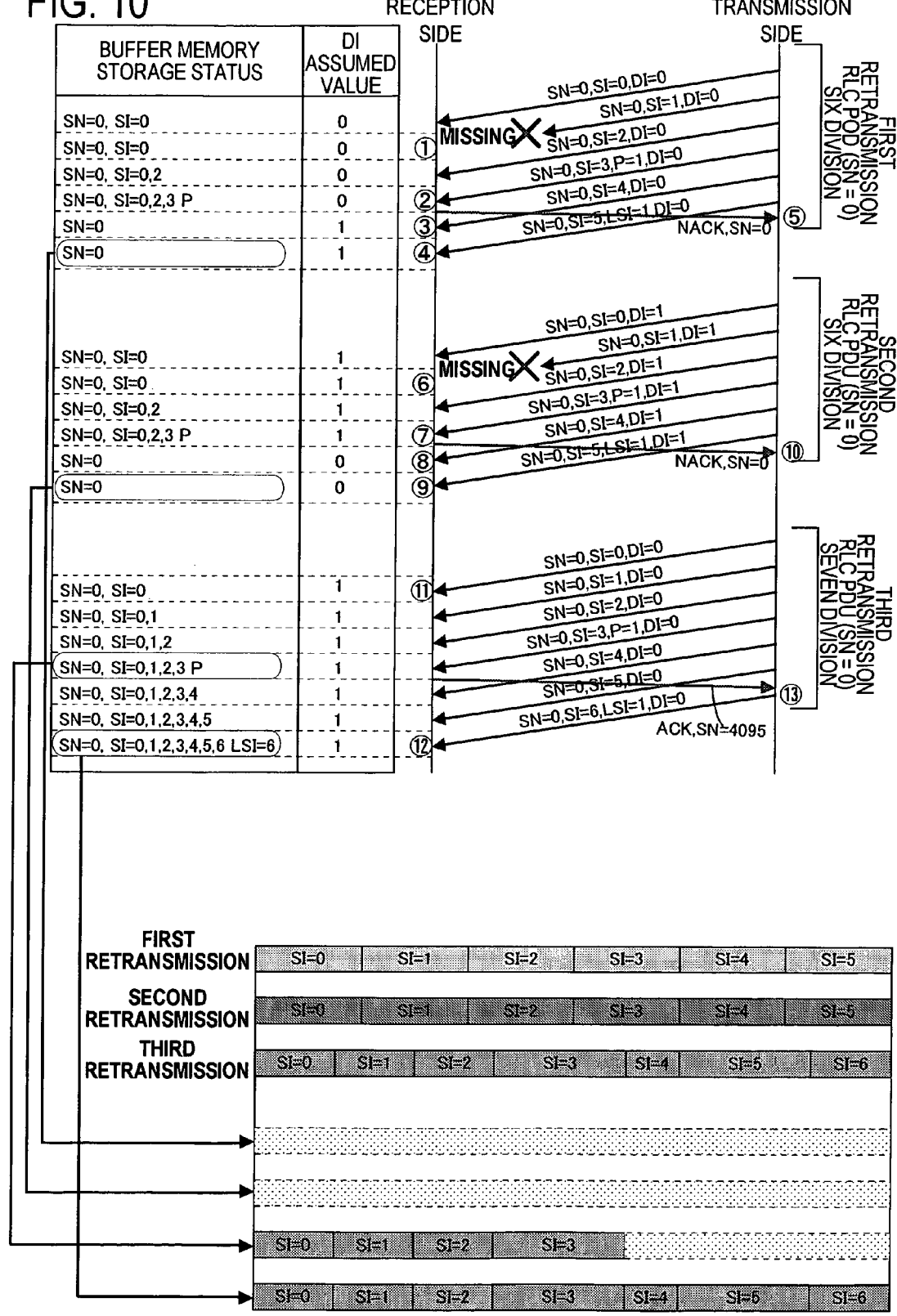
FIG. 10 is a diagram depicting a second operation example of the RLC controller 12 according to an embodiment of the present invention.

FIG. 10 is a diagram depicting a second operation example of the RLC controller 12 according to an embodiment of the present invention. Just like FIG. 8, the RLC PDU having sequence number SN=0 is divided into six at the first retransmission, and six RLC sub-PDUs having sequence number SN=0 and segment indicator SI=0 to 5 are transmitted from the transmission side RLC controller 22. At this time, the DI bit of the transmitted RLC sub-PDUs are all DI=0. The reception side RLC controller 12 also assumes the reception of RLC sub-PDUs having DI=0, since this is the first transmission of the RLC sub-PDUs having the sequence number SN=0.

The reception side RLC controller 12 sequentially receives the transmitted RLC sub-PDUs, confirms that the DI bit is DI=0, and stores the RLC sub-PDUs into the RLC buffer 11. In (1) in FIG. 10, the RLC sub-PDU having SN=0 and SI=1 is missing, and in (2), the STATUS-PDU generation timing is from the P bit assigned to the RLC sub-PDU having SN=0 and SI=3, and the reception side RLC controller 12 transmits a retransmission request to the transmission side as STATUS-PDU (NACK) with missing information SN=0 (RLC sub-PDU having SN=0 is missing).

When the retransmission request is transmitted, the RLC controller 12 clears (deletes from buffer) the information having SN=0 and SI=0, 2, and 3 which has already been received, so as to prepare for receiving the retransmission data, and switches the assumed value of the DI bit to DI=1, and stands by for reception of the RLC sub-PDUs having DI=1.

Then the RLC controller 12 receives the RLC sub-PDUs having SN=0 and SI=4 and 5 in (3) and (4), but discards these RLC sub-PDUs since the DI bit is DI=0, which is different from the assumed DI bit DI=1.

When the retransmission request STATUS-PDU (NACK) is received from the reception side RLC controller 12 in (5) in FIG. 10, the transmission side RLC controller 22 executes the retransmission control, in which the value of the DI bit of the RLC sub-PDU to be retransmitted is switched to DI=1, and transmits this RLC sub-PDU. As FIG. 10 shows, the RLC PDU having a sequence number SN=0 to be retransmitted for the first time is divided into six, just like the initial transmission, and six RLC sub-PDUs having sequence number SN=0 and segment indicator SI=0 to 5 are transmitted from the transmission side RLC controller 22.

The reception side RLC controller 12 sequentially receives the retransmitted RLC sub-PDUs, and a missing RLC sub-PDU having SN=0 and SI=1 occurs again in (6) in FIG. 10, and in (7), the STATUS-PDU generation timing is from the P bit added to the RLC sub-PDU having SN=0 and SI=3, and the reception side RLC controller 12 transmits a retransmission request to the transmission side as STATUS-PDU (NACK) with missing information SN=0 (RLC sub-PDU having SN=0 is missing).

Just like the first transmission of the RLC sub-PDUs when the retransmission request is transmitted again, the RLC controller 12 clears (deletes from buffer) the information having SN=0 and SI=0, 2 and 3 which has already been received, so as to prepare for receiving the retransmission data, and switches the assumed value of the DI bit to DI=0, and stands by for reception of the RLC sub-PDUs having DI=0. At this time, it is assumed that the maximum time for the RLC sub-PDUs having DI=0, which were transmitted by the first transmission of the RLC sub-PDUs, to possibly be received, considering receive delay, has elapsed.

Then the RLC controller 12 receives the RLC sub-PDUs having SN=0 and SI=4, and 5 in (8) and (9), but discards these RLC sub-PDUs, just like the first transmission, since the DI bit is DI=1, which is different from the assumed DI bit DI=0.

When the retransmission request STATUS-PDU (NACK) is received again from the reception side RLC controller 12 in (10) in FIG. 10, the transmission side RLC controller 22 executes the second retransmission control, in which the value of the DI bit of the RLC sub-PDU to be transmitted is switched again to DI=0, and transmits this RLC sub-PDU. As FIG. 10 shows, the RLC PDU having a sequence number SN=0 to be retransmitted for the second time is divided into seven, unlike the initial transmission and the first retransmission, and seven RLC sub-PDUs having sequence number SN=0 and segment indicator SI=0 to 6 are transmitted from the transmission side RLC controller 22.

In (11) in FIG. 10, the RLC controller 12 receives the RLC sub-PDUs having DI=0 again, confirms that DI=0, and stores the RLC sub-PDUs into the RLC buffer 11. In the second retransmission, the RLC controller 12 receives the RLC sub-PDUs in the sequence of the segment indicator SI, and in (12) in FIG. 10, the RLC controller 12 receives the RLC sub-PDUs (SN=0, SI=6) having LSI=1, that is the last segment indicator SI, and when all the RLC sub-PDUs having the sequence number SN=0 are received, the RLC controller 12 combines the RLC sub-PDUs having the sequence number SN=0, and generates the RLC PDU having the sequence number SN=0.

In the second retransmission as well, the reception side RLC controller 12 transmits STATUS-PDU from the P bit added to the RLC sub-PDU having SN=0 and SI=3, but there is no missing RLC sub-PDU at this point, so the reception side RLC controller 12 transmits STATUS-PDU (ACK) to recognize that all the RLC sub-PDUs up to SN=4095 before SN=0 have been received, and the transmission side RLC controller 22 receives this, hence retransmission control is not performed again.

In this way, retransmission of the RLC sub-PDUs can be identified not only by the retransmission count SC of which value is incremented at each retransmission, but also by the DI bit (binary information) of which value is switched between 1 and 0 at each retransmission, and RLC PDU can be correctly generated by combining the RLC sub-PDUs having a same DI bit.

SC and DI were described as examples of the first and second identifiers for distinguishing between retransmissions, but the present invention is not limited to this. For example, SC and SN (SI) may be combined. In other words, the lower one digit or two digits of an SN (SI) are used as an SC.

What is claimed is:

1. A radio communication apparatus for receiving variable length Radio Link Control (RLC) sub-PDU data in an RLC layer belonging to a layer 2 constituting a protocol layer of radio communication and for assembling one RLC PDU data from a plurality of RLC sub-PDU data, comprising:
a buffer memory; and
a controller for referring to retransmission identification information for identifying between a first retransmission and a second retransmission included in a header of received RLC sub-PDU data, stores into the buffer memory, the RLC sub-PDU data having the retransmission identification information identical to a preset assumed value, and for assembling the RLC PDU data from the RLC sub-PDU data having the identical retransmission identification information;

wherein the controller changes the assumed value whenever transmitting a retransmission request for the RLC sub-PDU data corresponding to a predetermined RLC PDU data;
wherein the retransmission identification information is the number of times of retransmission, and the controller increments the assumed value by a predetermined unit value whenever transmitting the retransmission request for the RLC sub-PDU data corresponding to the predetermined RLC PDU data.

2. The radio communication apparatus according to claim 1, wherein the retransmission identification information is binary information, and the controller alternately switches the assumed value between binary values whenever transmitting a retransmission request for the RLC sub-PDU data corresponding to the predetermined RLC PDU data.

3. The radio communication apparatus according to claim 2, wherein the binary information is assigned to one bit in a data extension area, HE (Header Extension) area, in a header of the RLC sub-PDU data.

4. A radio communication apparatus for transmitting variable length Radio Link Control (RLC) sub-PDU data in an RLC layer belonging to a layer 2 constituting a protocol layer of radio communication, comprising:
a generator for generating a plurality of variable length RLC sub-PDU data by dividing one RLC PDU data; and
a transmission controller for adding first retransmission identification information for indicating a first retransmission to the generated plurality of variable length RLC sub-PDU data and transmitting the variable length RLC sub-PDU data with the first retransmission identification information added thereto, and for adding second retransmission identification information for indicating a second retransmission, which is different from the first retransmission identification information, to the variable length RLC sub-PDU data, and retransmitting the variable length RLC sub-PDU data with the second retransmission identification information added thereto when a retransmission request for the transmitted RLC sub-PDU data is received;
wherein the second retransmission identification information is a value obtained by adding a predetermined value to the first retransmission identification information.

5. The radio communication apparatus according to claim 4, wherein the first retransmission identification information and second identification information are binary information, which are one and the other of binary values respectively.

6. The radio communication apparatus according to claim 5, wherein the binary information is assigned to one bit in a data extension area, HE (Header Extension) area, in a header of the RLC sub-PDU data.

7. A radio communication apparatus for transmitting variable length Radio Link Control (RLC) sub-PDU data, comprising:
a generator for generating a plurality of variable length RLC sub-PDU data by dividing one RLC PDU data; and
a transmission controller for adding first identification information indicating a first retransmission to the plurality of variable length RLC sub-PDU data and transmitting the variable length RLC sub-PDU data with the first identification information added thereto, and for adding second identification information indicating a second retransmission, which is different from the first retransmission, to the variable length RLC sub-PDU data obtained by dividing the RLC PDU, and retransmitting the variable length RLC sub-PDU data with the second identification information added thereto when a retransmission request for the transmitted RLC sub-PDU data is received;

wherein the second retransmission identification information is a value obtained by adding a predetermined value to the first retransmission identification information.

8. A transmission method for transmitting variable length Radio Link Control (RLC) sub-PDU data from a radio communication apparatus, comprising:

generating a plurality of variable length RLC sub-PDU data by dividing one RLC PDU data;

adding first identification information indicating a first retransmission to the plurality of variable length RLC sub-PDU data, and transmitting the variable length RLC sub-PDU data with the first identification information added thereto; and adding second identification information indicating a second retransmission, which is different from the first retransmission, to the variable length RLC sub-PDU data obtained by dividing the RLC PDU, and retransmitting the variable length RLC sub-PDU data with the second identification information added thereto when a retransmission request for the transmitted RLC sub-PDU data is received;

wherein the second retransmission identification information is a value obtained by adding a predetermined value to the first retransmission identification information.

* * * * *